United States Patent
Vashi

(10) Patent No.: US 9,775,125 B1
(45) Date of Patent: Sep. 26, 2017

(54) APPARATUS, SYSTEMS AND METHODS FOR ENHANCING IP MULTIMEDIA SUBSYSTEM SERVICE CONTINUITY

(71) Applicant: APPLE INC., Cupertino, CA (US)

(72) Inventor: Prashant H. Vashi, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/179,662

(22) Filed: Jun. 10, 2016

(51) Int. Cl.
  *H04W 4/00* (2009.01)
  *H04W 60/00* (2009.01)
  *H04L 29/06* (2006.01)
  *H04W 76/02* (2009.01)
  *H04W 84/04* (2009.01)

(52) U.S. Cl.
  CPC ....... *H04W 60/005* (2013.01); *H04L 65/1006* (2013.01); *H04L 65/1016* (2013.01); *H04W 76/027* (2013.01); *H04W 76/028* (2013.01); *H04W 84/042* (2013.01)

(58) Field of Classification Search
  CPC  H04W 60/005; H04W 36/0022; H04W 12/08
  See application file for complete search history.

(56) References Cited

U.S. PATENT DOCUMENTS

| | | | |
|---|---|---|---|
| 2008/0244266 A1* | 10/2008 | Cai | H04L 9/3271 713/170 |
| 2011/0002327 A1* | 1/2011 | Dwyer | H04W 48/18 370/352 |
| 2013/0024574 A1* | 1/2013 | Lau | H04L 65/1069 709/227 |
| 2016/0119378 A1* | 4/2016 | Khalil | H04W 12/02 726/14 |

* cited by examiner

*Primary Examiner* — Justin Lee
(74) *Attorney, Agent, or Firm* — Fay Kaplun & Marcin, LLP

(57) ABSTRACT

Described herein are apparatus, systems and methods for enhancing Internet protocol ("IP") multimedia subsystem service continuity. The methods including, at a user equipment ("UE") connected to a first network using a first Radio Access Technology ("RAT") and authorization information, connecting to a second network using a second RAT, transmitting a first registration attempt to an IP multimedia subsystem ("IMS") associated with the second network, determining that the registration attempt with the IMS associated with the second network did not complete, clearing the authorization information, reconnecting to the first network and transmitting a second registration attempt to the IMS associated with the first network without the authorization information.

20 Claims, 4 Drawing Sheets

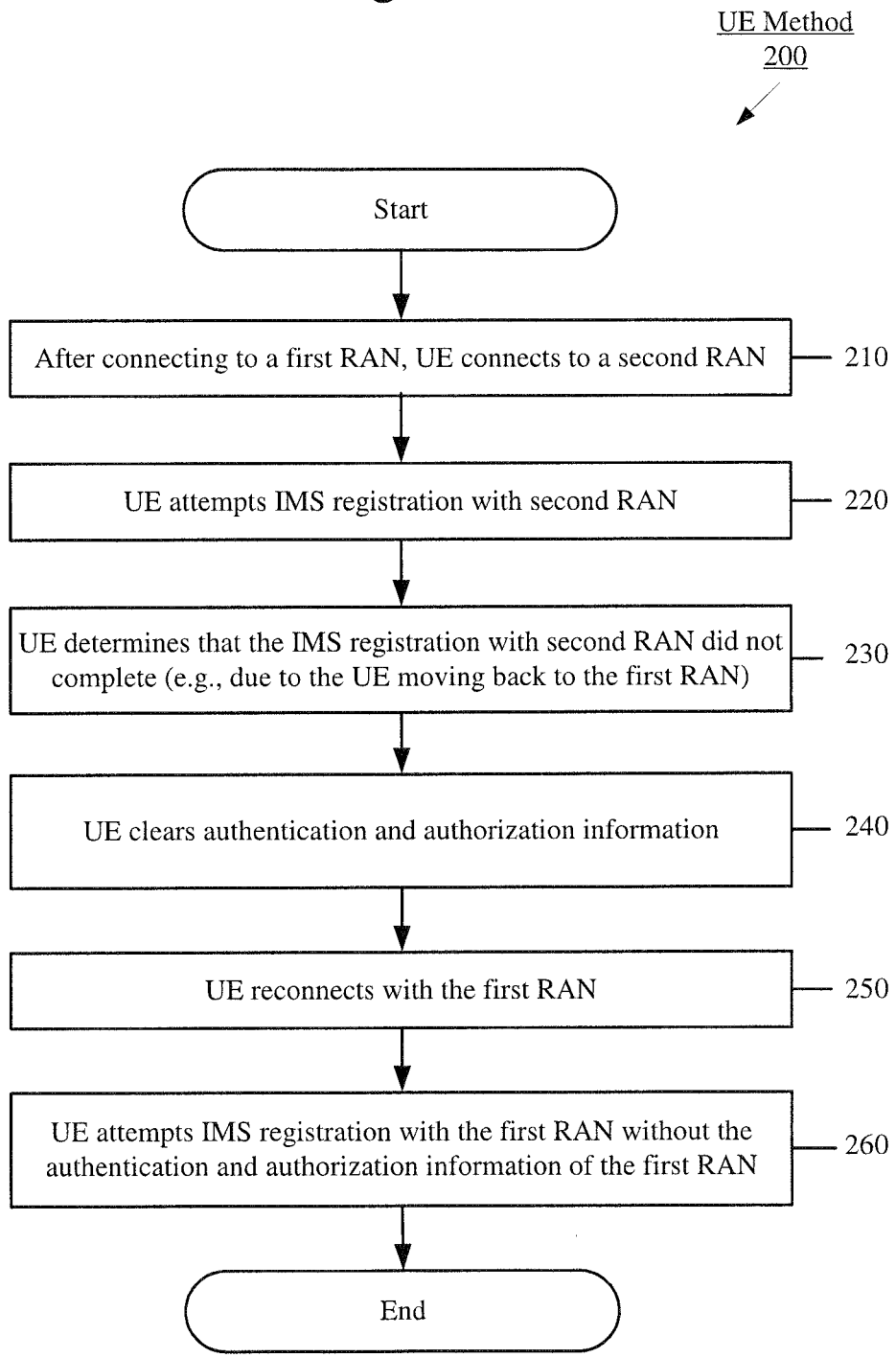

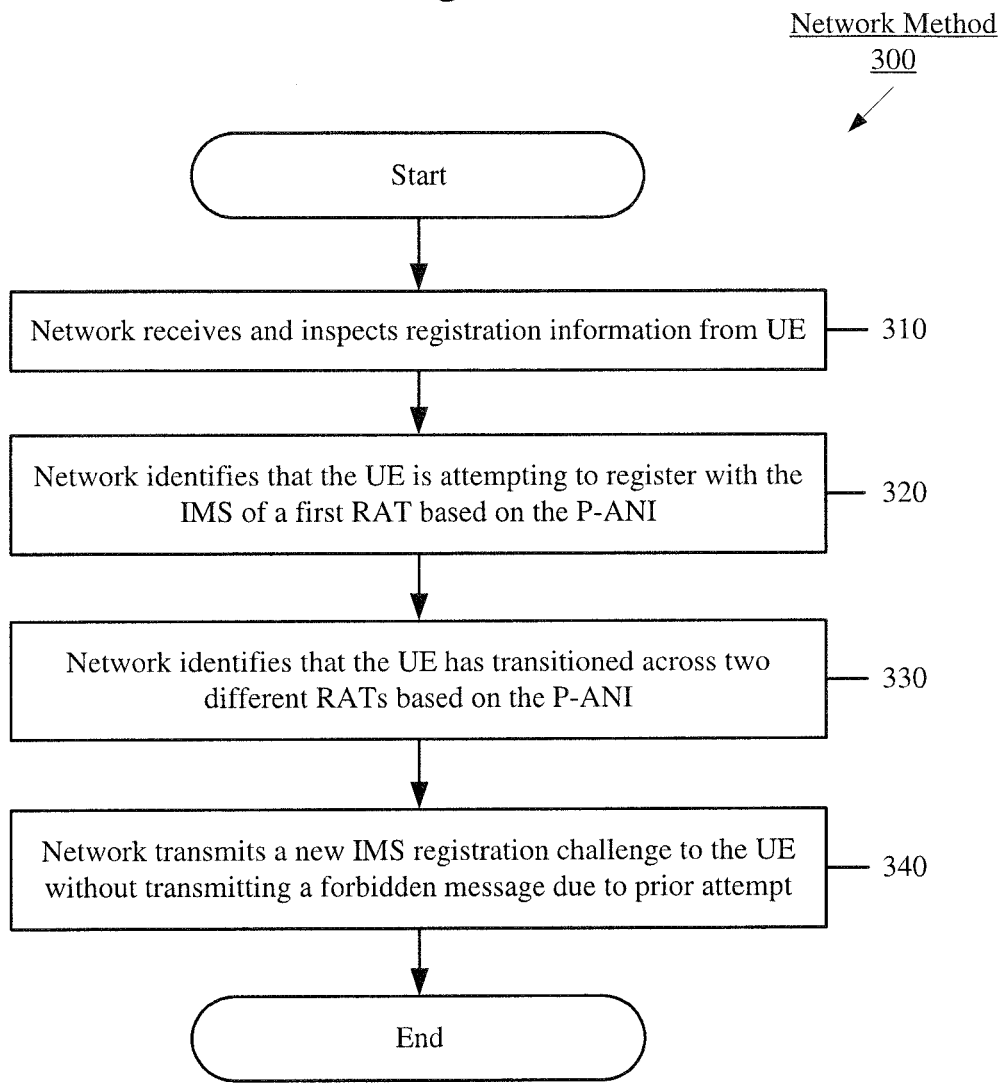

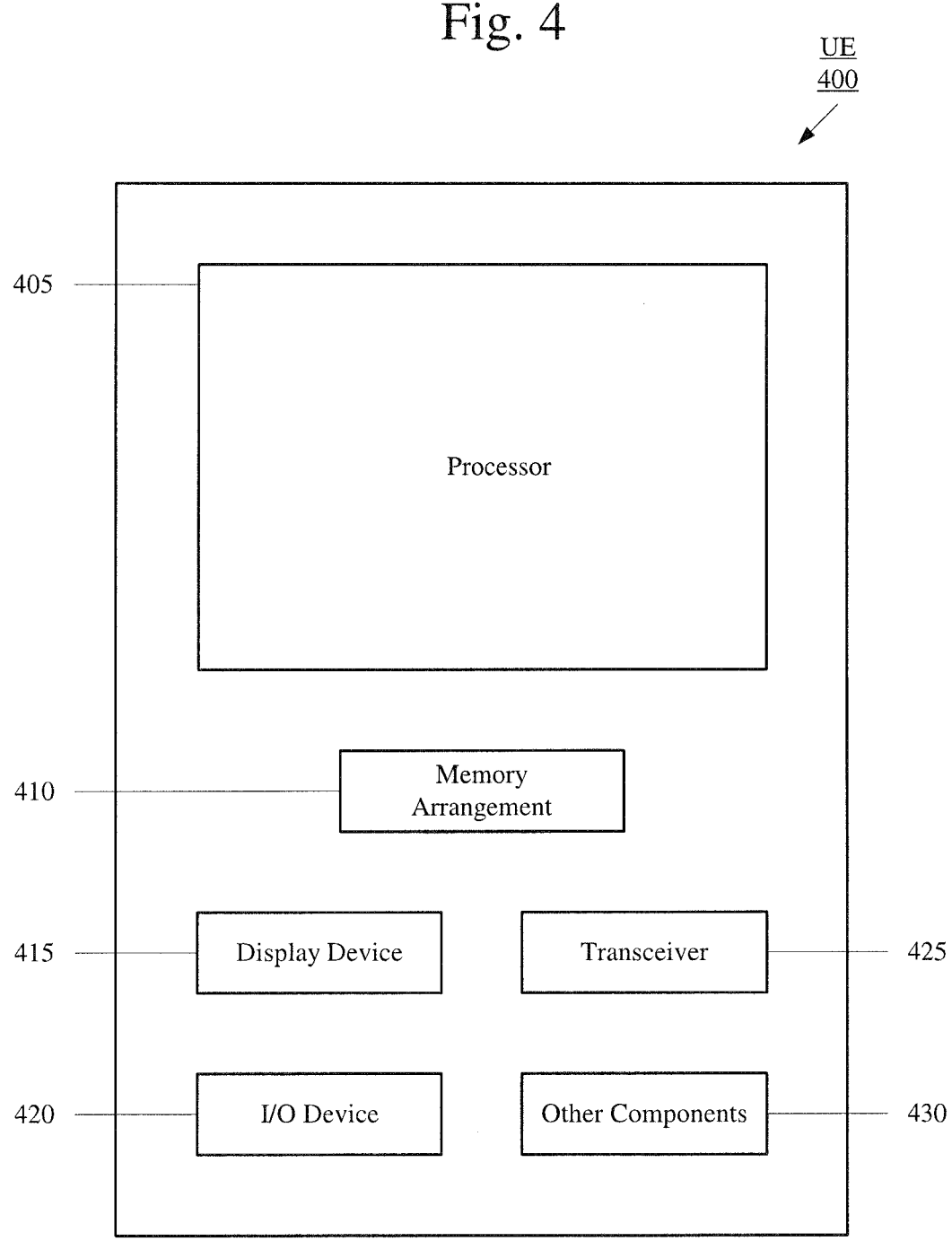

APPARATUS, SYSTEMS AND METHODS FOR ENHANCING IP MULTIMEDIA SUBSYSTEM SERVICE CONTINUITY

BACKGROUND

In wireless telecommunication networks, Long-Term Evolution, or "LTE," is defined as a standard for wireless communication of high-speed data for mobile phones and data terminals. The LTE standard is developed by the Third Generation Partnership Project ("3GPP"). An exemplary LTE access network is a wireless network of base stations, or evolved NodeBs ("eNBs"), that are interconnected without a centralized intelligent controller. The LTE standard has been described as a natural upgrade path for carriers using prior generation networks or "legacy" protocols, such as Global System for Mobile Communications/Universal Mobile Telecommunications System ("GSM/UMTS") protocols and Code Division Multiple Access ("CDMA") 2000 1× (e.g., 1×RTT or simply "1×") wireless communication protocols. Each of these different types of networks and protocols may be termed radio access technologies ("RATs").

Through the usage of an all-Internet Protocol ("IP") network, the LTE standard supports only packet switching ("PS") data transmissions. Similar to many other protocols, an IP network breaks data into blocks and wraps the blocks into structures called packets. Each packet contains, along with the data load, information about the IP address of the source and the destination nodes, sequence numbers, control information, etc. In a circuit switched ("CS") network, the communication channel remains open and in use throughout the duration of the call and the call data is transmitted all at once without being broken into blocks.

Mobile phones on older RATs (e.g., GSM, UMTS and CDMA2000) have provided voice call services over a switched-circuit-style network. However, carriers adopting the LTE standard have re-engineered their voice call network to exchange data over an IP packet-switched network, such as Voice over LTE ("VoLTE"), circuit-switched fallback ("CSFB"), and simultaneous voice and LTE ("SV-LTE"). For instance, the VoLTE approach uses an IP multimedia subsystem ("IMS") network having specific profiles for control and media planes of voice service on LTE. The IMS may be defined as an architectural framework for delivering IP multimedia services. IMS was originally designed by the 3GPP as a means for evolving mobile networks beyond GSM and to deliver Internet services over General Packet Radio Service ("GPRS").

SUMMARY

Described herein are apparatuses, systems and methods for enhancing Internet protocol ("IP") multimedia subsystem service continuity. The methods including, at a user equipment ("UE") connected to a first network using a first Radio Access Technology ("RAT") and authorization information, connecting to a second network using a second RAT, transmitting a first registration attempt to an IP multimedia subsystem ("IMS") associated with the second network, determining that the registration attempt with the IMS associated with the second network did not complete, clearing the authorization information, reconnecting to the first network and transmitting a second registration attempt to the IMS associated with the first network without the authorization information.

Further described herein is UE connected to a first network using a first Radio Access Technology ("RAT") and authorization information. The UE including a transceiver configured to enable the UE to establish a connection to the first network and a processor configured to instruct the transceiver to connect to a second network using a second RAT, instruct the transceiver to transmit a first registration attempt to an IP multimedia subsystem ("IMS") associated with the second network, determine that the registration attempt with the IMS associated with the second network did not complete, clear the authorization information, instruct the transceiver to reconnect to the first network, and instruct the transceiver to transmit a second registration attempt to the IMS associated with the first network without the authorization information.

Further described herein is a method comprising, at a component connected to a network, receiving and inspecting registration information from a UE connected to a first network using a first RAT, determining that the UE is attempting to register with a second network while previously being registered with the first network based on the registration information, determining that the UE has transitioned from the second network back to the first network, and transmitting a new registration challenge without refusing registration to the UE.

BRIEF DESCRIPTION OF THE DRAWINGS

FIG. 2 shows an exemplary method for enhancing IMS service continuity at a mobile device, such as the UE, in multiple wireless networks, such as a legacy RAN and a LTE-RAN, according to various embodiments described herein.

FIG. 3 shows a further exemplary method for enhancing IMS service continuity at a network, according to various embodiments described herein.

FIG. 4 shows an exemplary UE according to various embodiments described herein.

DETAILED DESCRIPTION

Figure 1:
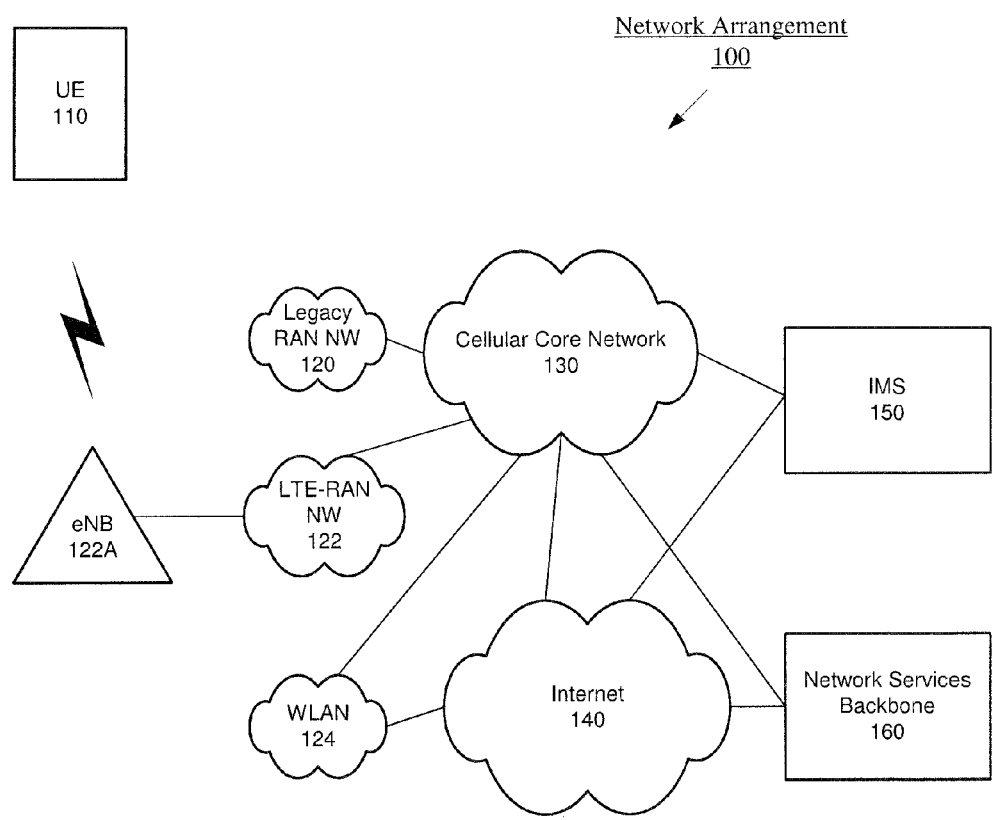
FIG. 1 shows an exemplary network arrangement for enhancing IMS service continuity, according to various embodiments described herein.

The exemplary embodiments may be further understood with reference to the following description and the appended drawings, wherein like elements are referred to with the same reference numerals. The exemplary embodiments describe an apparatus, system and method for enhancing internet protocol ("IP") multimedia subsystem service continuity. In the exemplary embodiments, a mobile device will be described as user equipment ("UE") and the base station will be described as an evolved Node B ("eNB") base station, which is generally known as being a base station associated with an LTE radio access network ("LIE-RAN"). However, it will be understood by those skilled in the art that UEs and base stations operating in accordance with other network standards may also implement the exemplary embodiments in accordance with the functionalities and principles described herein. This includes further evolutions of the wireless standards, e.g., 5G networks and standards.

The LTE-RAN may be a portion of the cellular networks deployed by cellular providers or operators (e.g., Verizon, AT&T, Sprint, T-Mobile, etc.). These networks may include, for example, base client stations (Node Bs, eNodeBs, HeNBs, etc.) that are configured to send and receive traffic from UEs that are equipped with an appropriate cellular chip set. In addition to LTE-RAN, the operators may also include WiFi network connectivity and legacy radio access technologies ("RATs") that are generally labeled as 2G and/or 3G networks and may utilize circuit switched voice calls and packet switched data operations. For instance, the UE may transition from an LTE-RAN to a WiFi network and back to the LTE-RAN. Likewise, the UE may transition from WiFi to LTE and back to WiFi for WiFi calling (e.g., VoLTE). Furthermore, the UE may transition from the LTE-RAN to a 3G network and back to the LTE-RAN, and vice versa. Those skilled in the art will understand that the cellular providers may also deploy other types of networks, including further evolutions of the cellular standards, within their cellular networks.

As will be described in greater detail below, operators may utilize an IP Multimedia Subsystem ("IMS"). The IMS may be generally described as an architecture for delivering multimedia services to the UE using the IP protocol. In the context of the LTE-RAN, the IMS may provide an exemplary UE with voice capabilities (e.g., VoLTE) as well as Short Messaging Services ("SMS") capabilities. In the context of legacy RATs, such as a 3G-RAT, the IMS may also provide the UE with IP-capable features, such as SMS services. Services such as SMS may be offered across these legacy RATs due to low bandwidth requirements and no Quality of Service ("QoS") requirements. However, services such as voice and video transmission may only be offered on RATs that offer high speed capabilities while having enough capacity for QoS, such as an LTE-RAN.

FIG. 1 shows an exemplary network arrangement 100 according to various embodiments described herein. The exemplary network arrangement 100 includes the UE 110. Those skilled in the art will understand that the UE 110 may be any type of electronic component that is configured to communicate via a network (e.g., mobile phones, tablet computers, desktop computers, smartphones, phablets, embedded devices, wearables, etc.). The UE 110 may be configured to perform cellular and/or WiFi functionalities and may include processors, memory arrangements, displays, transceivers, etc. It should also be understood that an actual network arrangement may include any number of UEs being used by any number of users and being associated with any number of these users where the user may be associated with one or more UEs. That is, the example of one UE 110 is only provided for illustrative purposes.

The UE 110 may be configured to communicate directly with one or more networks. In this example, the networks with which the UE 110 may communicate are a legacy radio access network ("RAN") 120 (e.g., having a 3G-RAT), an LTE RAN 122 (e.g., having an LTE-RAT), and a WiFi or wireless local area network ("WLAN") 124. More specifically, the legacy RAN 120 may be a circuit switched network, e.g., GSM, UMTS, CDMA, 1×RTT, 1×, etc. In this example, each of the networks 120, 122 is a wireless network with which the UE 110 may communicate wirelessly. However, it should be understood that the UE 110 may also communicate with other types of networks and may also communicate using a wired connection.

With regards to the exemplary embodiments, the UE 110 may establish a connection with the LTE-RAN 122 to, among other functionalities, perform data transfers, voice calls and exchange SMS messages with the LTE network. In another example, the UE 110 may communicate with the legacy RAN 120 to perform some or all of the same functionalities, depending, for example, on the availability of a connection between the UE 110 and the LTE-RAN 122.

The network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

As described above, the network arrangement 100 also includes an IMS 150 to provide the UE 110 with voice capabilities (e.g., VoLTE) and messaging capabilities (e.g., SMS). The UE 110, in order to use the services provided by the IMS 150, needs to register with the IMS 150. The IMS 150 may include a variety of components to accomplish these tasks. For example, a typical IMS 150 includes a Home Subscriber Server ("HSS") that stores subscription information for a user of the UE 110. This subscription information is used to provide the correct multimedia services to the user. The IMS 150 may communicate with the cellular core network 130 and the Internet 140 to provide the multimedia services to the UE 110. The IMS 150 is shown in close proximity to the cellular core network 130 because the cellular provider typically implements the functionality of the IMS 150. However, it is not necessary for this to be the case such as when the IMS 150 is provided by another party. Thus, the network arrangement 100 allows the UE 110 to perform functionalities generally associated with computers and cellular networks.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks. The network services backbone 160 may interact with the UE 110 and/or the networks 120, 122, 130, 140 to provide these extended functionalities.

The network services backbone 160 may be provided by any entity or a set of entities. In one example, the network services backbone 160 is provided by the supplier of the UE 110. In another example, the network services backbone 160 is provided by the cellular network provider. In still a further example, the network services backbone 160 is provided by a third party unrelated to the cellular network provider or the supplier of the UE 110.

The exemplary embodiments relate to the UE 110 connecting to LTE-RAN 122 via an eNB 122A. Initially, the UE 110 may establish a connection to the LTE-RAN 122. Those skilled in the art will understand that any association procedure may be performed for the UE 110 to connect to the LTE-RAN 122. For example, as discussed above, the LTE-RAN 122 may be associated with a particular cellular provider where the UE 110 and/or the user thereof has a contract and credential information (e.g., stored on a SIM card). Upon detecting the presence of the LTE-RAN 122, the UE 110 may transmit the corresponding credential information to associate with the LTE-RAN 122. More specifically, the UE 110 may associate with a specific access point (e.g., the eNB 122A of the LTE-RAN 122).

As described above, when the UE 110 is associated with the LTE-RAN 122, the UE 110 may register with the IMS 150 to receive certain services such as VoLTE and SMS services. As part of registering with the IMS 150, the UE 110 will configure its internal stack to an LTE protocol stack. In addition, since the services will be provided using the IP based network, the UE 110 may also receive an IP address.

In order to use the services provided by the IMS 150, the UE 110 needs to register with the IMS 150. For instance, registration with the IMS 150 may be achieved when the UE 110 reports its device capabilities to its network. The reported device capabilities may include the ability to support certain capabilities, such as VoLTE and/or SMS over IP. In response to the UE report, the network may provide the UE 110 with the network capabilities through a non-access stratum ("NAS") message. For instance, the network capability of supporting SMS over IP may be reported to the UE 110 during the IMS registration procedure.

When the UE 110 transitions across different RATs, the UE 110 may perform an IMS re-registration with the IMS 150 based on the services that are compatible for a specific RAT. The UE 110 may transitions from a high priority RAT (e.g., the LTE-RAN 122) to a lower priority RAT (e.g., the legacy RAN 120) due to any number of reasons (e.g., availability, quality, etc.). Furthermore, while on the lower priority RAT, the UE 110 may then continuously attempt to return back to the initial high priority RAT or connect with another high priority RAT. As a result, the UE 110 may go through two transitions, specifically, a high priority RAT ("HP-RAT") to a low priority RAT ("LP-RAT") and the LP-RAT to the HP-RAT. These two transitions may result in the UE 110 triggering two separate IMS re-registrations, namely a first IMS registration for the HP-RAT to LP-RAT transition and a second IMS registration for the LP-RAT to HP-RAT transition.

A typical IMS registration is such that the first IMS re-registration attempt may be challenged by the network 130 through a signaling protocol, for instance, by sending a Session Initiation Protocol ("SIP") 401 message. The UE 110 would then need to respond to the network 130 by sending a new registration message while taking into account the challenge posed in the SIP 401 message. The transitions across the exemplary RATs discussed above may be very quick and could potentially lead to race conditions.

For example, upon moving from an HP-RAT to an LP-RAT, the UE 110 may send an IMS re-registration with appropriate feature tags on the LP-RAT. One skilled in the art would understand that feature tags may be used to indicate which IMS services are available and supported by the UE 110. For instance, feature tags may indicate that the UE 110 is capable of accepting SMS messages via SIP, or that the UE 110 supports circuit switched voice when combining circuit switched calls and/or video calls with IM sessions.

It is noted that it was described above that when a UE transitions across different RATs, the UE may perform an IMS re-registration with the IMS based on the services that are compatible for a specific RAT. For example, when the UE is IMS registered on one RAT and then moves to another RAT, the UE may send a registration to notify the network of the RAT change or the feature tag change (if the new RAT feature set is different than the previous one), then this registration is sometime referred to as a "re-registration." However, throughout this description, the term "registration" and its other forms, "register," "registered," etc., will be used to refer to and should be understood to encompass any registration and/or registration attempt with the IMS, e.g., an initial registration with the IMS, a re-registration with the IMS, etc.

Returning back to the exemplary UE 110, if the coverage on the LP-RAT is poor, the UE 110 may miss the response sent by the network 130, or the challenge may arrive after the UE 110 has already declared a registration timeout. Once the UE 110 has moved within the coverage of a HP-RAT (either the original LTE-RAN 122 or a new HP-RAT), the UE 110 may attempt to perform a second IMS registration with appropriate feature tags on the HP-RAT. However, because of the previous registration attempt, the UE 110 may the respond to the challenge last received from the LP-RAT on the new HP-RAT.

At this point, the network 130 and/or the IMS 150 may reject the second IMS registration attempt with a permanent error code, such as the SIP 403 "Forbidden" response, wherein the network 130 understood the request but refuses to fulfill it. In other words, the network 130 may now believe that the UE 110 is a rogue UE since it did not honor the challenge previously sent by the network over the LP-RAT (e.g., the legacy RAN 120).

The potential for overlapping IMS registrations may have a detrimental impact on the service provided to the UE 110, and thus detract from the user experience. For instance, the IMS registration process may introduce delays in the SMS service, waste the signaling load of the UE 110, waste network resources, etc.

FIG. 2 shows an exemplary method for enhancing IMS service continuity at a mobile device, such as the UE 110, in multiple wireless networks, such as the legacy RAN 120 and the LTE-RAN 122, according to various embodiments described herein. The method 200 will be described with reference to the network arrangement 100 of FIG. 1. It may also be considered that the exemplary eNB 122A may be aware of the network capabilities for each of the legacy RAN 120 and the LTE-RAN 122.

In 210, after connecting to a first RAN (e.g., the LTE-RAN 122), the UE 110 may then connect to a second network (e.g., the legacy RAN 120, the WLAN 124, etc.). Due to network conditions, the UE 110 may wish to transition from the first network to the second network, and vice versa. It is noted that the use of the LTE-RAN 122 and the legacy RAN 120 is merely for illustrative purposes. One skilled in the art would understand that exemplary embodiments of the systems and methods described herein may be applied toward any type of RAN and/or RATs.

It is noted that connecting to the second network in 210 may be performed while the UE 110 is connected to the first RAN (e.g., when the UE 110 transitions from the LTE-RAN 122 to the WLAN 124). Alternatively, connecting to the second network in 210 may be performed while the UE 110 is not connected to the first RAN (e.g., when the UE 110 transitions from the LTE-RAN 122 to a legacy RAN 120, such as a 3G network using evolved High Rate Packet Data ("eHRPD")).

In 220 the UE 110 may attempt IMS registration with the second network, legacy RAN 120, by transmitting a first registration attempt to the IMS 150 associated with the legacy RAN 120. For instance, the UE 110 may generate a registration request with the network 130 and/or the IMS 150 that includes authentication and authorization related information.

However, during this registration attempt, in 230 the UE 110 may determine that the IMS registration with IMS 150 associated with the legacy RAN 120 was not completed. For instance, the IMS registration with the legacy RAN 120 did not complete due to the UE 110 moving back to the first RAN, namely the LTE-RAN 122. Alternatively, the registration may not have completed due to legacy RAN 120 no longer being available to the UE 110 (e.g., UE 110 moved out of the legacy RAN 120 coverage area), or a higher priority RAT has become available (e.g., the LTE-RAN 122 has become available to the UE 110).

In 240, the UE 110 may clear the authentication and authorization related information for the LTE-RAN 122. When registering on the legacy RAN 120, the UE 110 may use the challenge information from the first successful registration on the LTE-RAN 122 in the first attempt it sends to the network 130. Furthermore, in 250, the UE 110 may reconnect to the first network (the LTE-RAN 122) and attempt to register with the IMS 150 associated with the LTE RAN 122.

Accordingly, in 260, the UE 110 may transmit an IMS registration request on the LTE-RAN 122 without any of the previous authentication and authorization related information. By clearing this information in 240, the UE 110 is able to avoid receiving a "forbidden" response from the network 130 because the new authentication and authorization related information is not related to the previous unsuccessful registration. Thus, the network 130 will not categorize the new attempt as a response to the challenge from the legacy RAN.

The exemplary method 200 may result in power savings for the UE 110 due to the reduced signaling and also results in an improved user experience since the UE 110 may continue to access services available through the IMS 150 (e.g., VoLTE, high definition video, video telephony, etc.) immediately, without the delay associated with unsuccessful registration with the network 130 and/or the IMS 150.

FIG. 3 shows a further exemplary method 300 for enhancing IMS service continuity at the network 130, according to various embodiments described herein. The method 300 will be described with reference to the network arrangement 100 of FIG. 1. Furthermore, while method 300 is described as being performed by the network 130, the method may also be performed by the IMS 150 or by a network component or processor residing at either the IMS 150 or a server of the network 130.

In 310, the network 130 may receive and inspect registration information from the UE 110. For instance, the network 130 may receive a P-Access-Network-Infor ("P-ANI") header from the UE 110 including header information related to the UE 110 and the RAT currently being used. Those skilled in the art will understand that the P-ANI may be used to provide RAT information to proxies (e.g., IMS 150) that are providing services to the UE 110. For example, the UE 110 may use this header to pass information about the access network such as the RAT and radio cell identity. Thus, the network may understand the RAT which the UE 110 is currently using. In other words, a change in the RAT may trigger a change in the P-ANI header. Accordingly, inspecting the P-ANI suggests that the RAT has changed and the re-registration is due to the change in the RAT.

In 320, the network 130 may use the P-ANI header to identify that the UE 110 is attempting to register with the IMS 150 of a first RAT. As noted above, the P-ANI may be used by the network to understand that the UE 110 had previously attempted IMS registration with a second RAT because of the different P-ANI information being received from the UE 110. In other words, based on the information extrapolated from the P-ANI, the network 130 may be able to determine that the UE 110 has transitioned between the first and second RATs. Furthermore, the network 130 may be able to determine whether or not any IMS registration attempts with either the first or second RAT had been successful or failed.

Thus, in 330, the network 130 may then identify that the UE 110 has transitioned across two different RATs based on the information identified in 320. Furthermore, the network 130 may also determine that the UE 110 did not respond to an earlier IMS registration challenge for the legacy RAN 120 (e.g., the IMS registration attempt had failed). For instance, the UE 110 may have missed a previous challenge or the UE 100 did not receive the previous challenge prior to a timeout.

In 340, the network 130 may forego sending a refusal response, such as the SIP 403 Forbidden message. Instead, the network may transmit a new IMS registration challenge to the UE 110. For instance, the network 130 may transmit a new SIP 401 Unauthorized message to request fresh authentication and authorization information from the UE 110.

FIG. 4 shows an exemplary UE 400 according to various embodiments described herein. The UE 400 may represent any electronic device that is configured to perform wireless functionalities and may be representative of the UE 110 depicted in FIG. 1. Accordingly, the UE 400 may be a portable device such as a smartphone, a tablet, a phablet, a laptop, a wearable, etc. In another example, the UE 400 may be a client stationary device such as a desktop terminal. The UE 400 may be configured to perform cellular and/or WiFi functionalities. The UE 400 may include a processor 405, a memory arrangement 410, a display device 415, an input/output (I/O) device 420, a transceiver 425, and other components 430. The other components 430 may include, for example, an audio input device, an audio output device, a battery, a data acquisition device, ports to electrically connect the UE 400 to other electronic devices, etc.

The processor 405 may be configured to execute a plurality of applications of the UE 400. It should be noted that the above-described functionalities may be implemented as an application (e.g., a program) executed by the processor 405. However, the functionality may also be implemented as a separate incorporated component of the UE 400, or may be a modular component coupled to the UE 400 (e.g., an integrated circuit with or without firmware). In addition, in some UEs, the functionality described for the processor 405 is split among two processors, a baseband processor and an applications processor. The exemplary embodiments may be implemented in any of these or other configurations of a UE.

The memory 410 may be a hardware component configured to store data related to operations performed by the UE 400. Specifically, the memory 410 may store data related to various applications. The display device 415 may be a hardware component configured to show data to a user while the I/O device 420 may be a hardware component that enables the user to enter inputs. It should be noted that the display device 415 and the I/O device 420 may be separate components or integrated together such as a touchscreen.

The transceiver 425 may be a hardware component configured to transmit and/or receive data. That is, the transceiver 425 may enable communication with other electronic devices directly or indirectly through a network based upon an operating frequency of the network. The transceiver 425 may operate on a variety of different frequencies or channels (e.g., set of consecutive frequencies) that are related to the VoLTE call functionality. Thus, an antenna (not shown) coupled with the transceiver 425 may enable the transceiver 425 to operate on the LTE frequency band.

It may be noted that the exemplary embodiments are described with reference to the LTE wireless communication system. However, those skilled in the art will understand that the exemplary embodiments may be applied to enhancing IMS service continuity of a mobile device within any wireless communication schemes including those having different characteristics from the LTE scheme and the aforementioned legacy schemes. For instance, the exemplary embodiments may be applied within any 3GPP network including LTE, Universal Mobile Telecommunications System ("UMTS"), etc. In other words, a network may indicate the SMS over IP capabilities to a UE through any number of methods, such as via a routing area update ("RAU") by a serving general packet radio service ("GPRS") support node ("SGSN") entity on the core network side (e.g., Node B in UTRAN).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE") connected to a first network using a first Radio Access Technology ("RAT") and authorization information:
   connecting to a second network using a second RAT;
   transmitting a first registration attempt to an internet protocol ("IP") multimedia subsystem ("IMS") associated with the second network;
   determining that the registration attempt with the IMS associated with the second network did not complete;
   clearing the authorization information;
   reconnecting to the first network; and
   transmitting a second registration attempt to the IMS associated with the first network without the authorization information.

2. The method of claim 1, wherein the first network is a Long Term Evolution ("LTE") network.

3. The method of claim 1, wherein the second network is one of a Global System for Mobile Communications ("GSM") network, a Universal Mobile Telecommunications System ("UMTS") network, a Code Division Multiple Access ("CDMA") network and a WiFi network.

4. The method of claim 1, wherein the registration attempt with the second network did not complete due to a failure to respond to a challenge from the second network.

5. The method of claim 4, wherein the challenge is provided to the UE in a Session Initiation Protocol ("SIP") message.

6. The method of claim 1, wherein the first registration attempt with the second network did not complete due to one of the UE reconnecting with the first network or a timeout.

7. The method of claim 1, wherein the first registration attempt includes feature tags indicating at least one IMS service supported by the UE.

8. A user equipment ("UE") connected to a first network using a first Radio Access Technology ("RAT") and authorization information, comprising:
   a transceiver configured to enable the UE to establish a connection to the first network; and
   a processor configured to:
   instruct the transceiver to connect to a second network using a second RAT,
   instruct the transceiver to transmit a first registration attempt to an internet protocol ("IP") multimedia subsystem ("IMS") associated with the second network,
   determine that the registration attempt with the IMS associated with the second network did not complete,
   clear the authorization information,
   instruct the transceiver to reconnect to the first network, and
   instruct the transceiver to transmit a second registration attempt to the IMS associated with the first network without the authorization information.

9. The UE of claim 8, wherein the first network is a Long Term Evolution ("LTE") network.

10. The UE of claim 8, wherein the second network is one of a Global System for Mobile Communications ("GSM") network, a Universal Mobile Telecommunications System ("UMTS") network, a Code Division Multiple Access ("CDMA") network and a WiFi network.

11. The UE of claim 8, wherein the registration attempt with the second network did not complete due to a failure to respond to a challenge from the second network.

12. The UE of claim 11, wherein the challenge is provided to the UE in a Session Initiation Protocol ("SIP") message.

13. The UE of claim 8, wherein the first registration attempt with the second network did not complete due to one of the UE reconnecting with the first network or a timeout.

14. The UE of claim 8, wherein the first registration attempt includes feature tags indicating at least one IMS service supported by the UE.

15. An integrated circuit, comprising:
   circuitry to connect to a first network using a first Radio Access Technology ("RAT") and authorization information:
   circuitry to connect to a second network using a second RAT;
   circuitry to transmit a first registration attempt to an internet protocol ("IP") multimedia subsystem ("IMS") associated with the second network;
   circuitry to determine that the registration attempt with the IMS associated with the second network did not complete;
   circuitry to clear the authorization information;
   circuitry to reconnect to the first network; and
   circuitry to transmit a second registration attempt to the IMS associated with the first network without the authorization information.

16. The integrated circuit of claim 15, wherein the first network is a Long Term Evolution ("LTE") network.

17. The integrated circuit of claim 15, wherein the second network is one of a Global System for Mobile Communications ("GSM") network, a Universal Mobile Telecommunications System ("UMTS") network, a Code Division Multiple Access ("CDMA") network and a WiFi network.

18. The integrated circuit of claim 15, wherein the registration attempt with the second network did not complete due to a failure to respond to a challenge from the second network.

19. The integrated circuit of claim 18, wherein the challenge is provided to the UE in a Session Initiation Protocol ("SIP") message.

20. The integrated circuit of claim 15, wherein the first registration attempt with the second network did not complete due to one of the UE reconnecting with the first network or a timeout.

* * * * *